United States Patent [19]

Bauer et al.

[11] 4,047,172
[45] Sept. 6, 1977

[54] SIGNAL PROCESSOR FOR PULSE-ECHO SYSTEM PROVIDING INTERFERENCE LEVEL COMPENSATION AND FEED-FORWARD NORMALIZATION

[75] Inventors: Lowell W. Bauer, Liverpool; John P. Costas, Fayetteville, both of N.Y.

[73] Assignee: General Electric Company, Syracuse, N.Y.

[21] Appl. No.: 257,879

[22] Filed: May 30, 1972

[51] Int. Cl.² .......................... G01S 7/28; G01S 9/44; G01S 9/66
[52] U.S. Cl. .............................. 343/17.1 R; 340/3 D; 343/8
[58] Field of Search ............... 340/3 D; 343/8, 17.1 R

[56] References Cited

U.S. PATENT DOCUMENTS

| | | | |
|---|---|---|---|
| 3,140,486 | 7/1964 | Gillmer | 343/17.1 R X |
| 3,149,333 | 9/1964 | Campbell | 343/8 X |
| 3,372,391 | 3/1968 | Lerner | 343/17.1 R |
| 3,716,823 | 2/1973 | Thompson et al. | 343/55 A X |

Primary Examiner—Malcolm F. Hubler
Attorney, Agent, or Firm—C. W. Baker; R. V. Lang; F. L. Neuhauser

[57] ABSTRACT

A signal processor is described for pulse-echo systems such as sonar and seismographic systems in which wave energy is transmitted and received as a train of discrete pulses of different frequencies ordered in predetermined sequence. The receiver comprises a plurality of signal processing channels each of which selects one subpulse and delays it through an interval of duration inversely related to its time position in the pulse train, to thus bring the received subpulse signals into time alignment so that when added their summed amplitude constitutes the target signal output. For interference level compensation, a running estimate is made of the interference level in each of the signal processing channels, and the channel signals then are weighted by this interference estimate as an inverse function of its magnitude. Interference level compensation in this manner provides optimized target visibility but may result in variation of signal levels in the doppler processing output channels, both channel-to-channel and within each channel as a function of range, so that if the processor output were directly displayed target returns of equal strength could be given unequal prominence in the display depending on their specific range and doppler values. Normalization to avoid this is accomplished by feed-forward of running estimates of the mean and variance signal values and combination thereof in particular relationship with the processor output to yield zero mean and unit variance in signal level outputs of the processor.

5 Claims, 4 Drawing Figures

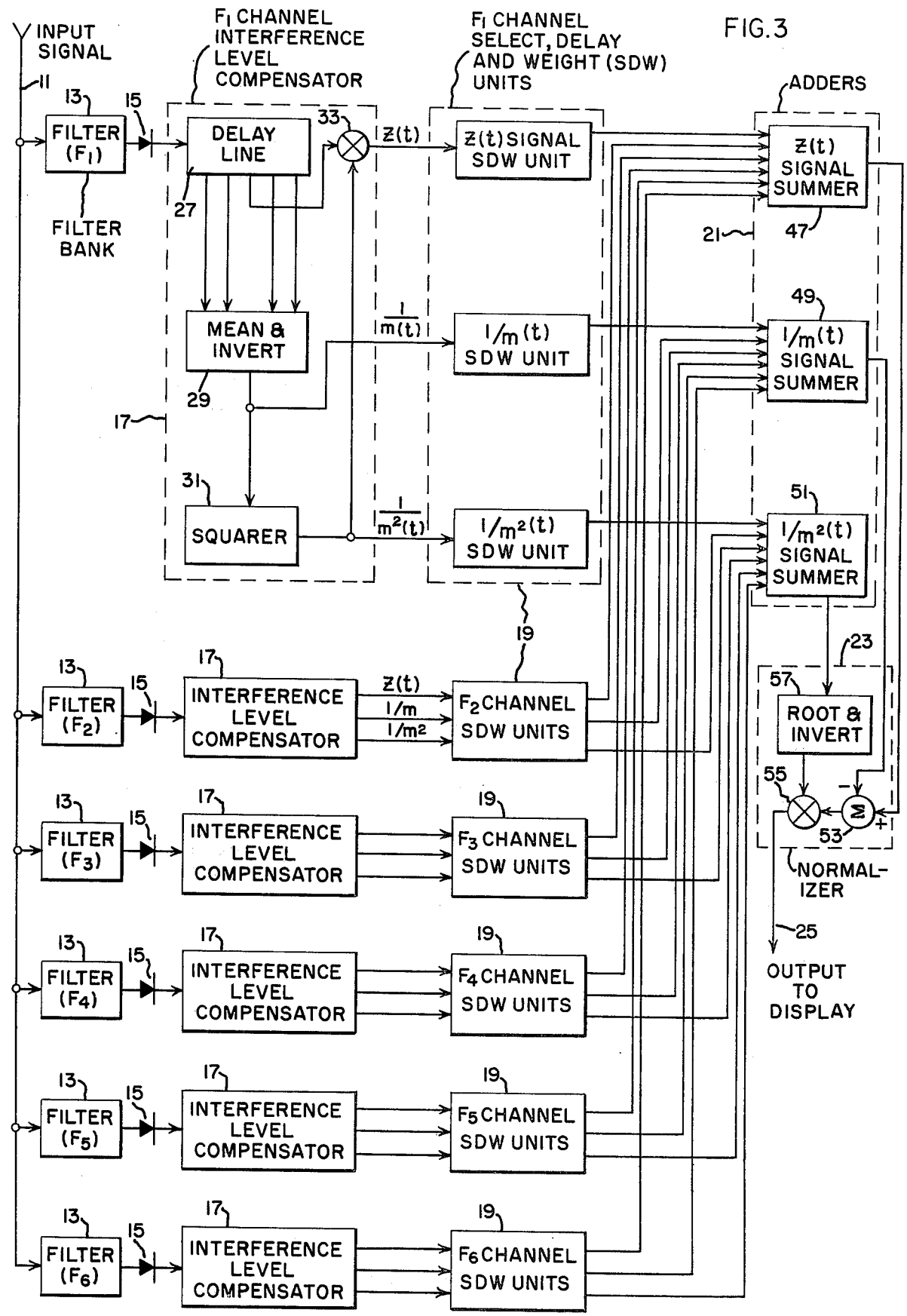

SIGNAL PROCESSOR FOR PULSE-ECHO SYSTEM PROVIDING INTERFERENCE LEVEL COMPENSATION AND FEED-FORWARD NORMALIZATION

FIELD OF THE INVENTION

This invention relates generally to sonar, seismographic and other pulse-echo systems of the kind including a pulsed wave energy transmitter for illuminating the field containing the object or feature of interest, and a receiver for sensing pulse-echo returns from the object to thus indicate its presence, location or movement. More particularly, this invention relates to signal processors for use in such pulse-echo systems for optimizing system performance against the deleterious effects of medium anomalies, noise and other interference, and it affords particular advantage in sonar systems due to the frequently more troublesome medium anomalies and interference encountered in the sonar application.

The particular difficulties common to the sonar operating environment principally result from reverberation or self-generated noise, high ambient noise levels, and discontinuities and other non-uniformities in propagation characteristics of the medium, all of which may vary rapidly with time, frequency, and position. Reverberation, which typically is the most troublesome of these difficulties, normally reaches very high levels shortly after pulse transmission and then gradually decays in level, though not necessarily monotonically, through the interpulse period. Since returns of pulse echoes of target interest may occur at various times during the interpulse period, while the reverberation level is thus varying, the signal-to-interference ratio may vary widely as a function of time. This ratio tends to vary with target doppler as well, because echo signals from high velocity targets are more widely separated from the transmitted subpulse frequencies and so may suffer less reverberation interference which of course is highest at the transmitted frequencies. The background or interference power level accordingly is subject to substantial variation in both time and frequency.

It is known that in order to optimize the detection performance of sonar systems the transmitted pulse should be "medium-matched," i.e., its range resolution should be chosen to correspond to the range uncertainty imposed by the medium, and its frequency or doppler resolution chosen to correspond to the frequency or doppler uncertainty imposed by the medium. One pulse structure which has been found in practice to be well-matched and to yield good target detection performance comprises a coded pulse train of discrete subpulses arranged in a predetermined sequence, with each subpulse occupying a unique position in the frequency and time domains. This coded pulse structure may be shown to be optimized with regard to both reverberation performance and noise performance for peak-power-limited transmitters, and it accordingly is finding wide application.

As conventionally implemented, sonar systems employing this pulse structure comprise a plurality of signal processing channels each of which includes narrowband filter means for selecting an echo subpulse of a frequency corresponding to one of the transmitted frequencies either directly or as doppler-shifted by moving target reflection, and delay means for delaying the selected subpulse through a time interval of magnitude inversely related to the time position of that subpulse in the transmitted pulse train. This brings the detected subpulse signals into time alignment and enables their direct addition to yield a resultant sum voltage constituting the target output. Doppler coverage in this basic system is obtained by selecting different combinations of signal processing channels for the delay-and-add operation, the shift in channel index being determined by the amount of frequency shift involved for each different target doppler.

To compensate for variations in interference power level due to reverberation and other interference, various arrangements have been proposed for deriving a running estimate of the interference level and employing this estimate to compensate or normalize the output by applying a different weighting or percentage contribution to the summed output from each of the individual channels. Generally if the echo signal levels are expected to be approximately the same from channel to channel, as is usually the case, the channel signal weighting is simply made inversely proportional to interference power, i.e., to the square of the RMS interference voltage. Thus channels showing a strong background level are suppressed while those showing a low background level are correspondingly emphasized.

Interference level compensation in this way provides the best channel-to-channel balance, i.e., it optimizes the channel-to-channel balance for echo signal visibility and target detection. At the same time, however, it creates the problem that the variation in channel gain which must be introduced to optimize echo signal visibility also introduces an undesirable variation in amplification or weighting of target signals as a function of their frequency and reception time. The effect of this is to introduce a nonuniformity of gain of the different doppler output channels of the processor so that if the outputs are displayed directly there will result undesirable level variations.

BRIEF SUMMARY OF THE INVENTION

The present invention has as its principal objective the provision of signal processors which afford optimized target detection capabilities even in the presence of high and changing levels of noise and other interference, and which provide these capabilities through a combination of interference level compensation and signal level normalization with the latter serving to correct the variations in processor channel gain which result from the interference level compensation process so as to provide substantially uniform gain for target signals as outputted for display. It is also an object of the invention to accomplish this normalization using certain of the signals generated in the interference level compensation operation for purposes of the normalization operation as well, to thus achieve significant economies in system implementation and cost along with improved performance.

In its preferred embodiment the invention comprises means for deriving running estimates of the averaged or "mean" values of interference level and of their instantaneous or "variance" values, and means effective to normalize the processor output for these different variations in interferennce level in both time and frequency domains. More particularly, the signal processor of the invention includes a filter bank to which the received signals are applied, for frequency-selective routing to the appropriate one of a plurality of processor channels of number equal to the number of subpulses in the transmitted pulse train plus some additional number depending on the doppler coverage desired. Each of the processor channels includes interference level compensation means which derive a running estimate of the amplitude of interference and noise in adjacent resolution cells grouped in range, frequency or angular resolution about the signal sample being processed in that channel. The interference estimate thus derived is used to adjust the gain of the corresponding processor channel, and is used also in the normalization of that and other channels of the processor through a feed-forward technique in which the signal statistics derived in the interference level compensation operation are applied to the processor output for normalization in both time and frequency, preferably to yield zero change in the mean of the processor outputs and constant variance of the processor outputs irrespective of variations in interference power level. Alternative embodiments affording simplified implementation are feasible by combined control of signal mean and variance values and by multiplexing or otherwise time sharing various of the elements of the processor.

BRIEF DESCRIPTION OF THE DRAWINGS

The invention will be further understood and its objects, features and advantages more fully appreciated by reference to the following detailed description when read in conjunction with the accompanying drawings, wherein:

FIG. 3 is an electrical block diagram of a signal processor in accordance with the invention as applied to a sonar system.

DESCRIPTION OF THE PREFERRED EMBODIMENT

Figure 1:
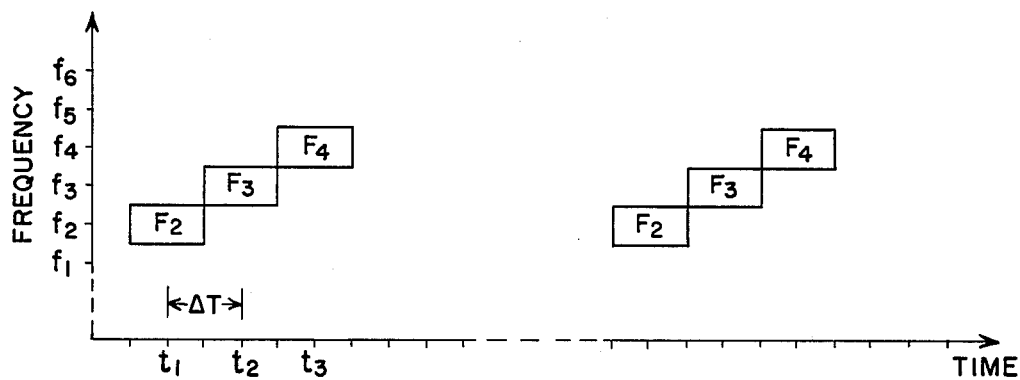
FIG. 1 illustrates a medium-matched pulse train common to sonar systems of the type in which the signal processor of this invention finds application.

With continued reference to the drawings, FIG. 1 illustrates a transmitted pulse train or coded pulse representative of those suitable for use with the processor of this invention. The pulse train comprises three time contiguous subpulses designated F2, F3 and F4 transmitted in nonoverlapping frequency bands of time duration and bandwidth matched to the medium. These subpulses are centered on transmit times spaced by $\Delta T$, and the subpulse sequence repeats at some relatively low repetition rate is indicated by the much larger time spacing between succeeding pulse trains in FIG. 1. The pulse train as illustrated here actually is much simplified to enable reasonable brevity of this description; in practice the number of subpulses in each pulse train would usually be at least several times larger and the subpulses would not necessarily be ordered in the simple staircase arrangement shown and may even be in random order. In some cases the subpulses could be coded pulses, each having a time-bandwidth product exceeding unity. In other cases two or more subpulses might occupy the same frequency and/or time position.

Figure 2:
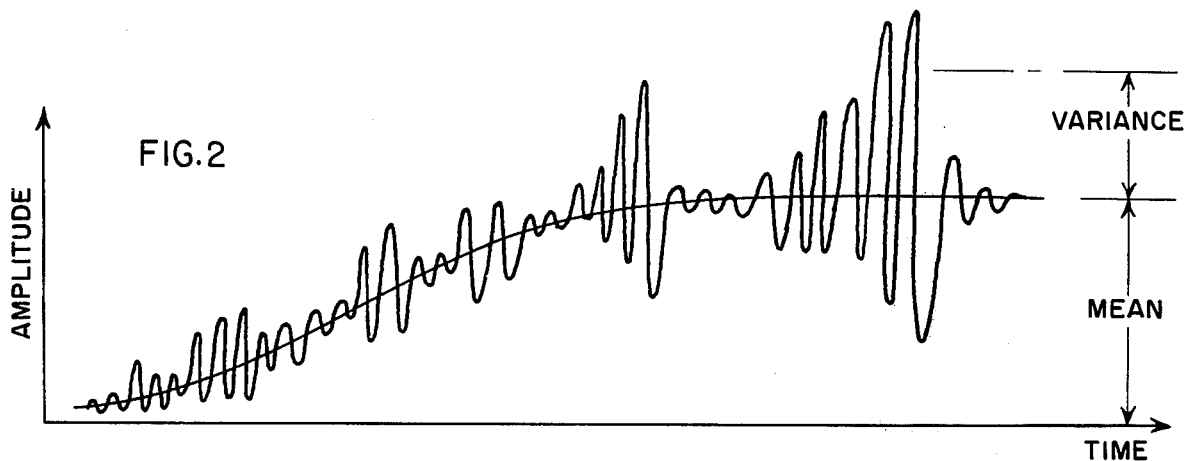
FIG. 2 illustrates a received signal waveform exemplary of systems of this kind, showing possible means and variance characteristics of the waveform.

FIG. 2 is intended to illustrate usage of the terms "mean" and "variance" as applied hereinafter. The mean and variance are shown for a typical waveform at a point in the processor, and as indicated, the mean value of this waveform is effectively its time-integrated or averaged value, whereas the variance is the root mean square value of signal variation about the mean. Ideally, the processor normalization should remove the mean entirely, or at least remove any change in the mean since this represents only a DC bias in the processor output signal. Echo signals represent deflection from the mean, for purposes of their display it is desirable that they be given substantially uniform amplification by the processor, i.e., that the effective processor signal gain not be a function of time. Thus to achieve normalization as desired for display of the processor output, the processor should provide insensitivity to changes in the mean or average power level and uniform sensitivity to instantaneous power levels which contain the useful target signal information, or, in short, the processor should display constant mean and variance.

With reference now to FIG. 3 the signal processor of the invention is shown in block diagram form. The receiver input signal on lead 11 is applied across a filter bank comprising frequency selective means 13 and a detector 15 for each frequency channel. The frequency selective elements 13 may conveniently comprise narrowband filters or "matched" filters if the subpulses have a time-bandwidth product greater than unity. These filters have their passbands centered on frequencies each of which corresponds to but may be displaced from one of the transmitted subpulses F2, F3 or F4 by a frequency difference appropriate to a particular target doppler. For purposes of simplicity of illustration FIG. 3 shows only sufficient of the filters to enable output of 0 doppler, −1 doppler, +1 and +2 doppler signal outputs for the 3-subpulse transmitted pulse train of FIG. 1. It will be appreciated that normally in operating systems a much larger doppler range and often much finer doppler resolution will be necessary, and that to accomplish this additional signal processor channels like those just described but with the passbands of the frequency selective elements 13 shifted correspondingly, will need be added in parallel with those shown.

The processor as illustrated in FIG. 3 accepts its signal input at a receiver intermediate frequency (IF) and the detectors 15 accordingly are included to provide an envelope-detected video signal output into each of the associated processor channels. Each such channel includes an interference level compensator (ILC) designated 17 in FIG. 3, followed by a select, delay and weight (SDW) unit 19 which serves to bring all of the received signal subpulses into proper time alignment for summation in adder units 21, which transmit the sum signals to a normalization unit 23 in which signal normalization is accomplished before output at 25 for display or other utilization.

The interference level compensators 17 are the same in all the processor channels, and as shown for the F1 channel each comprises means for deriving an estimate of interference level in that channel and compensating the signal accordingly. This estimation is derived through a multitap delay line 27, a mean and invert unit 29, a squarer 31 and multiplier 33 all connected in the arrangement shown.

Delay line 27 preferably contains an odd number of taps, the center tap being used to recover the detector output voltage $a(t)$ with a given delay, and the outboard taps on either side being used to determine a running estimate of the mean of $a(t)$ by looking both ahead and behind the center tap time. In other words, the signals on these outboard taps each represent signal level in a range resolution cell on either side of that containing the $a(t)$ signal, so that the average of these outboard tap signals provides a mean estimate of the interference power level in such adjacent range resolution cells. It might be noted here that since the delay between the input and the center tap of the delay line in each of the interference level compensators is identical for all channels, this delay does not otherwise affect the operation of the processor and so does not need be further factored into system operation.

The outputs of the delay line taps are summed and the mean value $m(t)$ inverted as at 29 to output a signal $1/m(t)$. This signal is squared at 31 to yield $1/m^2(t)$, which signal then is applied to one input of the multiplier 33 to which the delay line center tap provides the other input. An operational amplifier with inverse gain control could be used in lieu of the multiplier if preferred. The output of multiplier 33 is the center tap voltage a(t) divided by $m^2(t)$, which may conveniently be designated by $z(t) = a(t)/[m^2(t)]$. As a result of this processing, multiplier 33 outputs an interference level compensated voltage $z(t)$ representing the F1 channel output signal with its level adjusted in proportion to the inverse of the interference power, i.e., inversely with the square of the RMS interference voltage, which represents a continually updated estimate of background power level in that channel. The other outputs from each interference level compensator are sets of inverted mean signals $1/m(t)$ and the inverted power signal $1/m^2(t)$.

Figure 4:
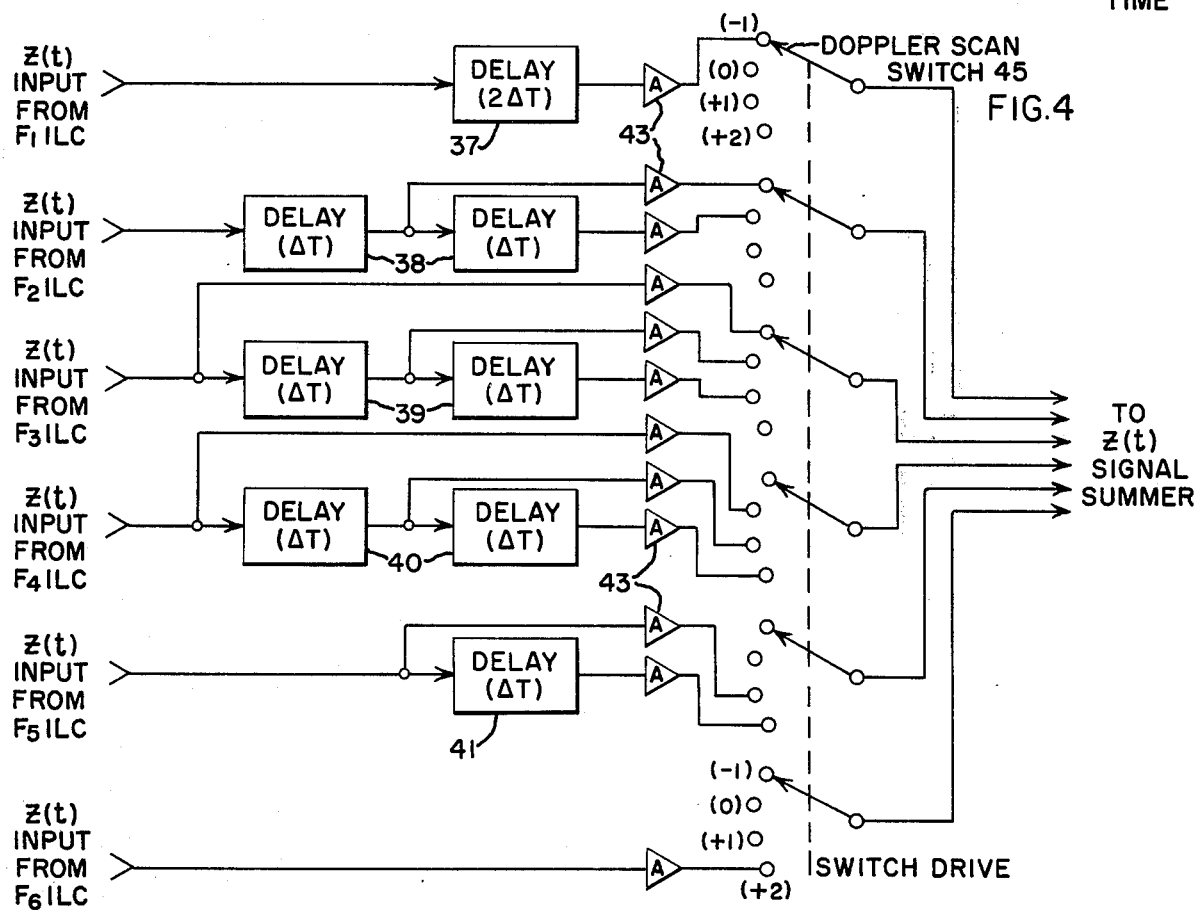
FIG. 4 illustrates in greater detail the select, delay and weight units in the processor of FIG. 3.

These three signal outputs from each channel ILC unit are transmitted to the appropriate one of the three select, delay and weight (SDW) units 19 of that channel, for processing as best shown in FIG. 4 to which reference now will be made. FIG. 4 illustrates the SDW units, for the $z(t)$ signals only, for all six of the filter channels shown. The SDW units for the $1/m(t)$ and $1/m^2(t)$ signals not shown in FIG. 4 would be identical in circuitry to those shown for the $z(t)$ signals and accordingly are not illustrated.

As previously explained, it is the basic function of the SDW units to order the F1-F6 subpulses into proper time alignment such that all subpulses which should be additive for any particular doppler value are synchronized in time so they will add properly. To this end, the SDW units may comprise a different number and arrangement of delay elements 37-41 for each of the doppler channels, with the F1 channel comprising a single delay element 37 of time delay $2\Delta T$, channel F2 comprising a pair of delay elements 38 each of time $\Delta T$, and the other channels providing delay elements as indicated. Multitap delay lines could instead be used if preferred. As also indicated, a variable gain amplifier 43 is interposed in each of the various paths which the $z(t)$ signals may take through the delay networks and to a doppler scan switch designated generally by reference numeral 45, which provides a switch position for each of the doppler values of interest.

As shown, scanning switch 45 provides connections such that for each of the indicated doppler values connection is made to the $z(t)$ input with a time delay as necessary to assure the proper subpulse time alignment for that particular doppler value. Thus for $-1$ doppler (D-1) the F1 channel signal is delayed two subpulse widths ($2\Delta T$), the F2 signal is delayed by 1 subpulse width ($\Delta T$) and the F3 signal is transmitted without delay; the F4, F5 and F6 signals are not factored into the $-1$ doppler signal value and accordingly have no D-1 switch connection provided. The switch connections and delay intervals provided for each of the other doppler values of interest will be obvious from FIG. 4 and from what has already been said with respect to the $-1$ doppler signal generation.

The amplifiers 43 provide the weighting function for the SDW units, with weighting being adjusted as follows for each of the $z(t)$ signal SDW units. A signal at a selected doppler is applied as the input signal on lead 11 (FIG. 3) with multiplier 35 temporarily bypassed so that $a(t) = z(t)$. When the $z(t)$ responses due to this excitation appear at the amplifier 43 inputs which correspond to the doppler selected, the voltage of the signal input into each of the amplifiers 43 is measured. The voltage gain of each amplifier then is set directly proportional to the input signal voltage which has been measured for that amplifier by the procedure just described.

For the $1/m(t)$ signal SDW units, the amplifiers 43 are adjusted to the same voltage gain as determined by the procedure just described for the corresponding amplifier of the $z(t)$ unit. The gain adjustment procedure for the $1/m^2(t)$ SDW amplifiers 43 is similar, except that here the amplifier voltage gains are set equal to the squares of the gains used for the corresponding $z(t)$ amplifiers.

The signal outputs of all the $z(t)$ SDW units are transmitted to the $z(t)$ signal summer 47 and additively combined therein; the outputs of the $1/m$ and $1/m^2$ SDW units all are similarly combined in the $1/m$ signal summer 49 and in the $1/m^2$ signal summer 49, respectively. These sum signals constitute the input to normalizer 23, in which the $z(t)$ and $1/m$ sum signals are applied to an adder 53 in the polarities indicated, resulting in subtraction of the $1/m$ signal from $z(t)$. The resultant is multiplied at 55 by a variance signal derived by means 57 for extracting the square root of the $1/m^2$ sum signal and inverting such root as indicated.

Thus the $1/m$ or mean signal input from summer 49 constitutes the feed-forward estimate of the mean of the interference level. The feed-forward estimate of the variance or $1/m^2(t)$ signal, as outputted by summer 49 to the root and inversion means 57, is the reciprocal of the estimate of the standard deviation or variance. The $z(t)$ signal when combined with these feed-forward normalization signals in adder 53 and multiplier 55 constitute the doppler signal normalized to zero mean and unit variance, for whatever doppler value may be called for by the present setting of the doppler scan switch as shown in FIG. 4. The output on lead 25, being fully normalized, is appropriate for display, automatic track detection or other operations as required.

In operation of the system as just described, any signal input at 11 within the frequency coverage of the doppler bank filters 13 will be passed thereby, envelope detected at 15, and applied to the appropriate one of the ILC units 17. That unit then outputs three signals, respectively identified as $z(t)$, $1/m$ and $1/m^2$ derived as hereinbefore explained. The $z(t)$ signal is fully compensated by the ILC unit through which it derives, and as a consequence of this compensation it reflects a variation in gain both with respect to DC signal level and with respect to impulsive or variance signals as well. Normalization to linearize the output with respect to time accordingly is desirable, but before normalization the respective $z(t)$, $1/m$ and $1/m^2$ signals for all dopplers are first processed in the select, delay and weight units 19 and added in summers 47, 49 and 51, to derive weighted and summed values for each of these signals. The signals then are combined in normalizer 23, in which the mean signal is subtracted from the output to normalize it for essentially constant amplification of target signals irrespective of range or time, and with multiplication by the variance signal so as to provide uniform response with regard to rapidly changing signal level.

By ways of analysis some additional description of the operation of the system of FIG. 3 may be given. The non-normalized amplitude-versus-time output of the $z(t)$ summer 47 for doppler index 1, $d_1(t)$, may be written as:

$$d_1(t) = \sum_k \sum_p c_{lkp} \frac{a_k(t - \tau_p)}{m_k^2(t - \tau_p)} \tag{1}$$

where $a_k(t)$ is the output of the $k$th channel ILC unit 17, $m_k(t)$ is the running mean estimate of $a_k(t)$, $\tau_p$ is one of a set of delays introduced by delay elements 37–41 (FIG. 4) and $c_{lkp}$ is one of a set of voltage gains provided by amplifiers 43 of FIG. 4. (In the most general case each doppler scan switch 45 point of FIG. 4 would comprise the sum of several delayed and amplified $z(t)$ terms). Thus in Equation 1, 1 is the doppler index, $k$ is the frequency channel index and $p$ is the time delay index.

Equation 1 may be simplified by letting the time functional be assumed and using dual subscripts on $a$ and $m$ to indicate dependence on both frequency channel and delay.

$$d_1 = \sum_{k,p} c_{lkp} \frac{a_{kp}}{m_{kp}^2} \tag{2}$$

Since (overbar indicates mean)

$$m_{kp} = \overline{a_{kp}} \tag{3}$$

it follows that $$\overline{d_1} = \sum_{k,p} c_{lkp} \frac{\overline{a_{kp}}}{m_{kp}^2} = \sum_{k,p} c_{lkp} \left(\frac{1}{m_{kp}}\right) \tag{4}$$

Comparing Equation 4 with Equation 2 shows that the mean of $d_1$ may be obtained by combining the $1/m(t)$ outputs from ILC unit 17 in precisely the same way that the $z(t)$ outputs are treated. Thus in FIG. 3 the $1/m(t)$ SDW and summer units operate in the same manner as the $z(t)$ units as previously described, and the $1/m(t)$ outputs "feed-forward" the mean estimates of interference power levels in the $z(t)$ outputs.

In the quasi-stationary analysis which follows it is assumed that the $a_{kp}$ terms of Equation 2 are independent due to frequency separation, time separation, or both. It is further assumed that $a_{kp}$ has a one-parameter distribution such that:

$$\sigma_{a_{kp}} = \alpha \overline{a_{kp}} = \alpha m_{kp} \tag{5}$$

where $\alpha$ is a constant. It follows that $$\sigma^2_{a_{kp}} = \overline{a^2_{kp}} - m^2_{kp} = \alpha^2 m^2_{kp} \tag{6}$$

The variance of $d_1$ of Equation 2, $\sigma_{d_1}^2$, is equal to the sum of the variances of the individual terms $$\sigma_{d_1}^2 = \sum_{k,p} \frac{c_{lkp}^2}{m_{kp}^4}(\overline{a^2_{kp}} - m^2_{kp}) = \sum_{k,p} \frac{\alpha^2 c_{lkp}^2}{m_{kp}^2} \tag{7}$$

$$\sigma_{d_1} = \alpha \left[\sum_{k,p} c_{lkp}^2 \left(\frac{1}{m_{kp}^2}\right)\right]^{1/2} \tag{8}$$

Equation 8 shows that the variance of the doppler bank outputs may be fed-forward by operation on the $1/m^2(t)$ terms from ILC units 17 by the $1/m^2(t)$ SDW and summer units in the same manner as with the $z(t)$ and $1/m(t)$ terms, except that here the voltage gain terms $c_{lkp}$ must be the square of the values used in the other operations. It might be noted here that while this inverse-square operation has been found to work well, other weighting rules may be used if preferred. Thus $z(t)$ could be set equal to $a/m^b(t)$ where $b$ is an exponent other than 2.

As will be clear from FIG. 3 and Equations 1–8, the doppler bank normalizing unit 23 first removes the mean and then divides this difference by the standard deviation. The result is a set of outputs on line 25 normalized to zero mean and unit variance.

The embodiment of the invention just described represents a full optimized version in which some simplification is possible while still preserving a level of performance suitable to many applications. For example, the feed-forward of the variance or $1/m^2$ signal could be omitted and the $1/m$ summer 49 output could be inverted and coupled directly into the multiplier 55. This would continue to provide full normalization for mean level variation, and also would help reduce the amplitude of the variance change though only partially and not completely as where the variance signal also is fed-forward. It is also possible to omit the variance feed-forward while retaining simple subtraction of the mean from the $z(t)$ signal as at 53, though this will leave the variance wholly uncorrected.

It will be appreciated that in lieu of a doppler scanning switch arrangement as just described, all doppler values could be simultaneously processed by duplicating the $z(t)$, $1/m(t)$ and $1/m^2(t)$ signal summers 21 and the normalizer elements 23 for each of the doppler values of interest. The weighting amplifiers 43 then would be directly and permanently connected into the signal summers 21 for the different doppler values in the same arrangement as shown accomplished by the doppler scan switch, thus eliminating the time sharing of signal summers and normalizers which it enables.

Finally, it will be appreciated that while the exemplary embodiment of the invention described has been implemented in analog form, the various possible processing steps involved readily lend themselves to digital processing and substantial economies may be achieved in practical systems using such digital implementation by utilization of the greater opportunities for multiplexing and time sharing which digital processors would afford. These and many other modifications within the scope of the invention will be obvious to those skilled in the art, and it is to be understood that the appended claims are intended to cover all such alternatives which fall within the spirit of the invention.

What is claimed as new and desired to be secured by Letters Patent of the United States is:

1. For use in an object detection system including transmitter means for illuminating the object with wave energy transmitted as a train of pulses of different frequencies ordered in particular sequence and including receiver means for detecting echo returns of transmitted energy as reflected by the object, received signal processor means comprising:
   a. a plurality of signal processor channels of number at least equal to the number of different frequencies in the transmitted pulse train;
   b. means responsive to frequencies of said received signal pulses for routing each thereof selectively into said processor channels;
   c. interference level compensation means in each of said processor channels including means for deriving an estimate of interference level for the respective channel and compensating the channel signals in accordance with an inverse function of such estimate, thereby providing an interference level compensated signal in each said channel;
   d. delay means in at least some of said processing channels for bringing signals therein into time alignment for summation;
   e. weighting means in at least some of said processor channels for individually adjusting signal levels therein in accordance with a predetermined weighting function;
   f. means for summing said channel signals as interference level compensated and time aligned in said processor channels; and
   g. output normalizing means including means for deriving a normalization signal from said interference level estimate and combining said normalization signal with said summed processor channel signals so as to normalize the processor output.

2. A signal processor as defined in claim 1 wherein said means for deriving said normalization signal from said interference level estimate generates both mean and variance normalization values which combine with said summed processor channel signals to yield zero mean and unit variance in processor output level.

3. A signal processor as defined in claim 1 wherein said processor channels include separate delay, weighting and summing means for said interference level compensated signals and for said interference level estimate as fed forward to generate said normalization signal.

4. A signal processor as defined in claim 1 wherein said output normalizing means derives from said interference level estimate first and second signals respectively indicative of the mean and variance values thereof, and combines these signals with said summed processor channel signals by subtraction of said first signal to yield zero mean and division by said second signal to yield unit variance.

5. For use in an object detection system including transmitter means for illuminating the object with wave energy transmitted as a plurality of subpulses of different frequencies ordered in particular sequence and including receiver means for detecting echo returns of transmitted energy as reflected by the object, received signal processor means comprising:
   a. a plurality of signal processor channels of number at least equal to the number of different frequencies of the transmitted subpulses;
   b. means responsive to frequencies of said received signal subpulses for routing each selectively into said processor channels;
   c. interference level compensation means in each of said processor channels including means for deriving an estimate of interference level for the respective channel and compensating the channel signals in accordance with an inverse function of such estimate;
   d. means for summing said interference level compensated signals corresponding to each of said transmitted subpulses; and
   e. output normalizing means including means for deriving a normalization signal from each of said interference level estimates, summing the normalization signals thus derived, and combining such sum with said summed interference level compensated signals so as to minimize change in mean of the processor output level.

* * * * *